United States Patent
Klipper et al.

(10) Patent No.: US 7,462,286 B2
(45) Date of Patent: Dec. 9, 2008

(54) CHELATE EXCHANGER

(75) Inventors: Reinhold Klipper, Köln (DE); Bruno Hees, Langenfeld (DE); Olaf Halle, Köln (DE); Wolfgang Podszun, Köln (DE); Pierre Vanhoorne, Monheim (DE); Hubertus Mittag, Wolfen (DE); Wolfgang Zarges, Köln (DE)

(73) Assignee: LANXESS Deutschland GmbH, Leverkusen (DE)

( * ) Notice: Subject to any disclaimer, the term of this patent is extended or adjusted under 35 U.S.C. 154(b) by 345 days.

(21) Appl. No.: 10/578,728

(22) PCT Filed: Nov. 6, 2004

(86) PCT No.: PCT/EP2004/012586

§ 371 (c)(1),
(2), (4) Date: May 10, 2006

(87) PCT Pub. No.: WO2005/049190

PCT Pub. Date: Jun. 2, 2005

(65) Prior Publication Data

US 2007/0062878 A1    Mar. 22, 2007

(30) Foreign Application Priority Data

Nov. 14, 2003  (DE) ............... 103 53 534

(51) Int. Cl.
*C02F 1/42* (2006.01)
(52) U.S. Cl. ........................ 210/681; 210/688
(58) Field of Classification Search .............. 210/681, 210/688
See application file for complete search history.

(56) References Cited

U.S. PATENT DOCUMENTS

| 2,980,607 | A | 4/1961 | Mock et al. .................. 210/31 |
| 4,077,918 | A | 3/1978 | Corte et al. ............... 260/2.1 E |
| 4,419,245 | A | 12/1983 | Barrett et al. ................ 210/681 |
| 4,427,794 | A | 1/1984 | Lange et al. .................. 521/28 |
| 4,444,961 | A | 4/1984 | Timm ......................... 526/88 |
| 4,952,608 | A | 8/1990 | Klipper et al. ................ 521/32 |
| 5,141,965 | A | 8/1992 | Pike ............................ 521/32 |
| 5,231,115 | A | 7/1993 | Harris ......................... 521/28 |
| 6,649,663 | B1 | 11/2003 | Klipper et al. ................ 521/32 |
| 2002/0185443 | A1 | 12/2002 | Klipper et al. .............. 210/688 |
| 2006/0173083 | A1 | 8/2006 | Klipper et al. ................ 521/25 |

FOREIGN PATENT DOCUMENTS

| DE | 150 078 | 8/1981 |
| GB | 867 528 | 5/1961 |
| UA | 2 105 346 | 3/1983 |
| WO | 91/17274 | 11/1991 |

OTHER PUBLICATIONS

Seidl et al., Adv. Polymer Sci., vol. 5 (1967), pp. 113-213 "Makroporose Styrol-Divinylbenzol-Copolymere und ihre Verwendung in der Chromatographie und zur Darstellung von Ionenaustauschern".
Database WPI, Section Ch, Week 197540 Derwent Publications Ltd., London, GB; AN 1975-66391W, XP002324953.
Database WPI, Section Ch, Week 200359 Derwent Publications Ltd., London, GB; AN 2003-623404, XP00234954.

*Primary Examiner*—Chester T Barry
(74) *Attorney, Agent, or Firm*—Nicanor A. Kohncke

(57) ABSTRACT

The present invention relates to novel ion exchangers comprising carboxyl groups and also —$(CH_2)_m NR_1 R_2$ groups having improved exchange kinetics and selectivity, a method for their production and also use thereof for the adsorption of metals, in particular arsenic, when these are additionally loaded with iron oxide/iron oxyhydroxide.

17 Claims, No Drawings

CHELATE EXCHANGER

CROSS REFERENCE TO RELATED PATENT APPLICATIONS

The present application claims the right of priority under 35 U.S.C. § 119 (a)-(d) and 35 U.S.C. § 365 of International Application No. PCT/EP2004/012586, filed on 6 Nov. 2004, which was published in German as International Patent Publication No. WO 2005/049190 A2 on Jun. 2005, which is entitled to the right of priority of German Patent Application No. DE 103 53 534.9 filed on 14 Nov. 2003.

The present invention relates to novel ion exchangers which comprise not only carboxyl groups, but also $-(CH_2)_m NR_1R_2$ groups, termed chelate-exchange resins hereinafter, having improved exchange kinetics and selectivity, a method for their production and also use thereof, where m is an integer from 1 to 4 and $R_1$ is hydrogen or a radical $CH_2$—$COOR_3$ or $CH_2P(O)(OR_3)_2$ or —$CH_2$—S—$CH_2COOR_3$ or —$CH_2$—S—$C_1$-$C_4$-alkyl or —$CH_2$—S—$CH_2CH(NH_2)COOR_3$ or

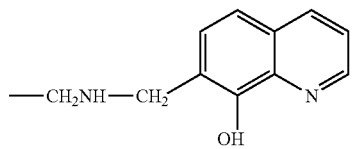

or its derivatives or $C=S(NH_2)$ and $R_2$ is a radical $CH_2COOR_3$ or $CH_2P(O)(OR_3)_2$ or —$CH_2$—S—$CH_2COOR_3$ or —$CH_2$—S—$C_1C_4$-alkyl or —$CH_2$—S—$CH_2CH(NH_2)COOR_3$ or

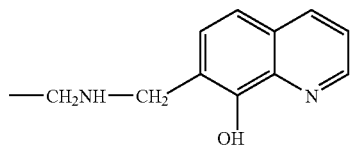

or its derivatives or $C=S(NH_2)$ and
$R_3$ is H or Na or K.

Many methods used in industry produce large amounts of aqueous mass streams which contain heavy metals or valuable materials. These include electroplating wastewaters which contain residual amounts of heavy metals. These also include aqueous mass streams from mines in which heavy metals such as nickel are present in aqueous sulfuric acid.

In the extraction of copper, in a process step a sulfuric acid copper solution which contains substances such as antimony, bismuth or arsenic is electrolyzed. The amount of these minor components must be kept low in order not to impede the electrolysis process.

To remove interfering heavy metals or to extract valuable materials, various methods are employed. In particular, substances are removed by liquid/liquid extraction methods or by using ion exchangers in bead form, in particular use being made of ion exchangers having chelating groups.

This requires ion exchangers which enable rapid diffusion of the ions from the solution into the bead interior and also a rapid binding/complexing to the chelating groups.

Efforts have been made in the past to produce ion exchangers having improved exchange kinetics.

U.S. Pat. No. 5,141,965 describes anion exchangers and also chelate-exchange resins having improved exchange kinetics.

The anion exchangers are produced here by reacting haloalkylated crosslinked bead polymers with amines in two steps. First, haloalkylated sites predominantly situated in the readily accessible outer region of the beads are converted into weakly basic groups by reaction with amines such as dimethylamine. Subsequently, less readily accessible bead regions are converted into strongly basic groups by reaction with amines such as trimethylamine. The exchangers are said to have acquired improved exchange kinetics due to exhibiting shortened diffusion pathways for the species to be separated, and also having an improved diffusion due to strongly basic groups situated in the bead interior. Chelate-exchange resins having weakly basic and strongly basic picolylamine structures are also produced in this manner in U.S. Pat. No. 5,141,965.

The method described in U.S. Pat. No. 5,141,965 improves the kinetics of the exchange process by the known bead polymers present being haloalkylated by known methods and these haloalkylated sites being further functionalized in different manners.

This procedure for improving the exchange kinetics has various disadvantages.

No improvement is made in the morphology of the bead polymer which makes up the great majority of the ion exchanger in the subsequently functionalized state and thus very substantially influences the kinetics. The pore structure of the beads is not optimized.

The improvement of exchange kinetics proceeds exclusively via subsequent functionalization of the haloalkylated bead polymer, which functionalization is arranged differently, compared with known methods, uses known substances which are only distributed differently over the bead diameter and thus are of very limited effect. A two-stage, and thus complex, functionalization proceeds, which is disadvantageous in practice.

There is therefore a requirement for novel ion exchangers in bead form which exhibit improved exchange kinetics and selectivity for ions to be separated off and also have a high mechanical and osmotic stability, a lower pressure drop in column methods, no abrasion, and also a significantly lower pressure drop than the ion exchangers according to the prior art.

It is then the object of the present invention to provide ion-exchange resins having the above described requirement profile for removing substances, preferably polyvalent cations, from liquids, preferably aqueous media or gases, and also provision of a method for production thereof.

The present invention relates to a method for producing novel ion exchangers which comprise not only carboxyl groups but also $-(CH_2)_m NR_1R_2$ groups, characterized in that a) monomer droplets of a mixture of a monovinyl aromatic compound, a polyvinyl aromatic compound, a (meth)acrylic compound, an initiator or an initiator combination and also if appropriate a porogen are reacted to form a crosslinked bead polymer, b) the resultant bead polymer is functionalized using chelating groups and in this step the copolymerized (meth)acrylic compounds are reacted to form (meth)acrylic acid groups and m is an integer from 1 to 4, $R_1$ is hydrogen or a radical $CH_2$—$COOR_3$ or $CH_2P(O)(OR_3)_2$ or —$CH_2$—S—$CH_2COOR_3$ or —$CH_2$—S—$C_1$-$C_4$-alkyl or —$CH_2$—S—$CH_2CH(NH_2)COOR_3$ or

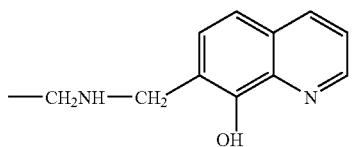

or its derivatives or C=S(NH$_2$),
R$_2$ is a radical CH$_2$COOR$_3$ or CH$_2$P(O)(OR$_3$)$_2$ or —CH$_2$—S—CH$_2$COOR$_3$ or —CH$_2$—S—C$_1$C$_4$-alkyl or —CH$_2$—S—CH$_2$CH(NH$_2$)COOR$_3$ or

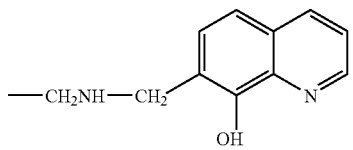

or its derivatives or C=S(NH$_2$) and
R$_3$ is H or Na or K.

After the polymerization, the bead polymer can be isolated using conventional methods, for example by filtration or decantation and if appropriate dried after one or more washes and, if desired, sieved.

Surprisingly, the inventively produced chelate-exchange resins which comprise not only carboxyl groups but also —(CH$_2$)$_m$NR$_1$R$_2$ groups exhibit improved exchange kinetics and selectivity compared with the prior art.

The inventive ion exchangers can be not only monodisperse, but also heterodisperse, gel-type, and also macroporous.

A mixture in the meaning of the present invention which comes into consideration in method step a) is, for example, a mixture of a monovinyl aromatic compound, a polyvinyl aromatic compound, and also a (meth)acrylic compound.

Preferably, as monovinyl aromatic compounds in the meaning of the present invention, in method step a), use is made of monoethylenically unsaturated compounds, such as, for example, styrene, vinyltoluene, ethylstyrene, α-methylstyrene, chlorostyrene, chloromethylstyrene.

Particularly preferably, use is made of styrene or mixtures of styrene with the above-mentioned monomers.

Preferred polyvinyl aromatic compounds in the meaning of the present invention for method step a) are multifunctional ethylenically unsaturated compounds, such as for example divinylbenzene, divinyltoluene, trivinylbenzene, divinylnaphthalene, trivinylnaphthalene, 1,7-octadiene, 1,5-hexadiene, ethylene glycol dimethacrylate, trimethylolpropane trimethacrylate, allyl methacrylate or diethylene glycol divinyl ether.

The polyvinyl aromatic compounds are generally used in amounts of 1-20% by weight, preferably 2-12% by weight, particularly preferably 4-10% by weight, based on the sum of all monomers. The type of the polyvinyl aromatic compounds (crosslinker) is selected with regard to the later use of the bead-type polymer.

Divinylbenzene is suitable in many cases.

Commercial divinylbenzene quality grades which, in addition to the isomers of divinylbenzene, also contain ethylvinylbenzene, are suitable for most applications.

(Meth)acrylic compounds in the meaning of the present invention are monoethylenically unsaturated compounds, such as for example (meth)acrylic acid alkyl esters, (meth) acrylonitriles, (meth)acrylic acid. Preference is given to methyl acrylate, methyl methacrylate or acrylonitrile.

In particular, according to the present invention use is preferably made of acrylonitrile or methyl acrylate.

The (meth)acrylic compounds are generally used in amounts of 1 to 30% by weight, preferably from 1 to 10% by weight, based on the sum of all monomers.

The, if appropriate microencapsulated, monomer droplets comprise an initiator or mixtures of initiators to initiate the polymerization. Initiators which are suitable for the inventive method are, for example, peroxy compounds, such as dibenzoyl peroxide, dilauryl peroxide, bis(p-chlorobenzoyl peroxide), dicyclohexyl peroxydicarbonate, tert-butylperoctoate, tert-butyl peroxy-2-ethylhexanoate, 2,5-bis(2-ethylhexanoylperoxy)-2,5-dimethylhexane or tert-amyl peroxy-2-ethylhexanoate, 2,5dipivaloyl-2,5-dimethylhexane; 2,5-bis(2-neodecanoylperoxy)-2,5-dimethyl-hexane; di-tert-butyl peroxyazelate; di-tert-amyl peroxyazelate; tert-butyl peroxyacetate; tert-amyl peroxyoctoate, and also azo compounds such as 2,2'-azobis(isobutyronitrile) or 2,2'-azobis(2-methylisobutyronitrile).

The initiators are generally used in amounts of 0.05 to 2.5% by weight, preferably 0.1 to 1.5% by weight, based on the sum of all monomers.

As further additives in the, if appropriate microencapsulated, monomer droplets, use can if appropriate be made of porogens to produce a macroporous structure in the bead polymer. Suitable substances for this are organic solvents which sparingly dissolve or swell the resultant polymer. Examples which may be mentioned are hexane, octane, isooctane, isododecane, methyl ethyl ketone, butanol or octanol and isomers thereof.

Depending on whether porogens are used, the bead polymers can be produced in gel-type or macroporous form.

The terms microporous or gel-type or macroporous have already adequately been described in the specialist literature, see Seidl et al. Adv. Polym. Sci., vol. 5 (1967), pp. 113-213.

Preferred bead polymers according to the present invention prepared by method step a) have a macroporous structure.

The bead polymers according to the present invention can be in heterodisperse or monodisperse form, in which case, to produce monodisperse bead polymers, use can be made of known methods, in particular spraying and fractionation by sieving.

Substances are described as monodisperse in the present application for which the uniformity coefficient of the distribution curve is less than or equal to 1.2. The uniformity coefficient is the quotient of the sizes d60 and d10. d60 describes the diameter at which 60% by mass of those in the distribution curve are smaller and 40% by mass are greater or equal. d10 designates the diameter at which 10% by mass in the distribution curve are smaller and 90% by mass are greater or equal.

The monodisperse, crosslinked vinyl aromatic bead polymer according to method step a) can be produced in such a manner that use is made of monodisperse, if appropriate encapsulated, monomer droplets consisting of a monovinyl aromatic compound, a polyvinyl aromatic compound and also an initiator or initiator mixture and if appropriate a porogen. Suitable methods are described in U.S. Pat. No. 4,444,961, EP-A 0 046 535, U.S. Pat. No. 4,419,245, WO 93/12167. Before polymerization, the if appropriate encapsulated monomer droplet is doped with a (meth)acrylic compound and then polymerized.

In a preferred embodiment of the present invention, in method step a), use is made of microencapsulated monomer droplets.

For microencapsulation of the monomer droplets, materials known for use as complex coacervates come into consideration, in particular polyesters, natural or synthetic polyamides, polyurethanes, polyureas.

As a natural polyamide, gelatin, for example, is particularly highly suitable. It is used, in particular, as coacervate or complex coacervate. Gelatin-containing complex coacervates in the meaning of the invention are taken to mean, especially, combinations of gelatin with synthetic polyelectrolytes. Suitable synthetic polyelectrolytes are copolymers having incorporated units of, for example, maleic acid, acrylic acid, methacrylic acid, acrylamide or methacrylamide. Particularly preferably, use is made of acrylic acid or acrylamide. Gelatin-containing capsules can be hardened using conventional hardening agents, such as, for example formaldehyde or glutaraldehyde. The encapsulation of monomer droplets using gelatin, gelatin-containing coacervates or gelatin-containing complex coacervates is described in detail in EP-A 0 046 535. The methods of encapsulation using synthetic polymers are known. A very suitable method is, for example, phase boundary condensation, in which a reactive component (for example an isocyanate or an acid chloride) dissolved in the monomer droplet is reacted with a second reactive component (for example an amine) dissolved in the aqueous phase.

The bead polymers prepared according to a) are reacted to form chelate-exchange resins which comprise not only carboxyl groups but also $—(CH_2)_m NR_1 R_2$ groups, by functionalization according to method step b).

Functionalization of the bead polymer by the phthalimide method can be carried out, for example, according to U.S. Pat. No. 4,952,608, DAS 2 519 244, or according to EP-A 10 78 690.

The bead polymers can also be functionalized by other methods. For example, by chloromethylation and subsequent reaction with amines, an aminomethylated copolymer can be obtained which can be reacted with suitable carboxyl-containing compounds, for example chloroacetic acid, to form chelate resins of the iminodiacetic acid type, see U.S. Pat. Nos. 4,444,961, 5,141,965.

In the functionalization of the bead polymers by the phthalimide method as described in method step b), the bead polymer is condensed with phthalimide derivatives. As catalyst in this case, use is made of oleum, sulfuric acid, or sulfur trioxide.

The elimination of the phthalic acid radical and thus the exposure of the $—(CH_2)_m NH_2$ group is performed in method step b) by treating the phthalimidomethylated crosslinked bead polymer with aqueous or alcoholic solutions of an alkali metal hydroxide, like sodium hydroxide or potassium hydroxide, at temperatures between 100 and 250° C., preferably 120-190° C. The sodium hydroxide solution concentration is in the range from 10 to 50% by weight, preferably 20 to 40% by weight. This method makes it possible to produce aminoalkyl-containing crosslinked bead polymers having a substitution of the aromatic nuclei greater than 1.

The resultant aminomethylated bead polymer is finally washed alkali-free using demineralized water.

In the strongly acidic, or strongly alkaline reaction conditions used, in addition to the phthalimidomethylation, the (meth)acrylic compounds in the polymer are also converted into (meth)acrylic acid units.

The functionalization in method step b), however, can also be carried out by the chloromethylation method, the inventive ion exchangers being produced by reacting the aminomethyl-containing monodisperse, crosslinked, vinyl aromatic base polymer in suspension with compounds which finally develop, as functionalized amine, chelating properties.

As preferred reagents, use is then made in method step b) of chloroacetic acid or its derivatives, formalin in combination with P—H acid (by modified Mannich reaction) compounds such as phosphorous acid, monoalkylphosphorous acid esters, dialkylphosphorous acid esters, formalin in combination with S—H acid compounds like thioglycolic acid, alkylmercaptans, L-cysteine or formalin in combination with hydroxyquinoline or its derivatives.

Particularly preferably, use is made of chloroacetic acid or formalin in combination with P—H acid compounds like phosphorous acid.

As suspension medium, use is made of water or aqueous mineral acid, preferably water, aqueous hydrochloric acid, or aqueous sulfuric acid in concentrations between 10 and 40% by weight, preferably 20 to 35% by weight.

The present invention further relates to the chelate-exchange resins produced by the inventive method comprising not only carboxyl groups but also $—(CH_2)_m NR_1 R_2$ groups obtainable by a) reacting monomer droplets of a mixture of a monovinyl aromatic compound, a polyvinyl aromatic compound, a (meth)acrylic compound, an initiator or an initiator combination and also if appropriate a porogen to give a crosslinked bead polymer, b) functionalizing the resultant bead polymer using chelating groups and in this step reacting the copolymerized (meth)acrylic compounds to form (meth)acrylic acid groups, where m is an integer from 1 to 4, $R_1$ is hydrogen or a radical $CH_2—COOR_3$ or $CH_2 P(O)(OR_3)_2$ or $—CH_2—S—CH_2 COOR_3$ or $—CH_2—S—C_1$-$C_4$-alkyl or $—CH_2—S—CH_2 CH(NH_2)COOR_3$ or

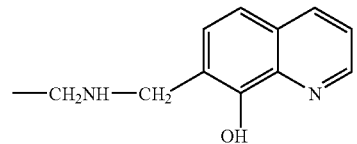

or its derivatives or $C=S(NH_2)$, $R_2$ is a radical $CH_2 COOR_3$ or $CH_2 P(O)(OR_3)_2$ or $—CH_2—S—CH_2 COOR_3$ or $—CH_2—S—C_1 C_4$-alkyl or $—CH_2—S—CH_2 CH(NH_2)COOR_3$ or

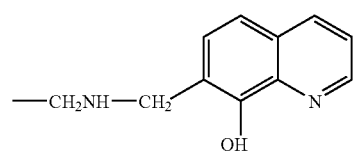

or its derivatives or $C=S(NH_2)$ and $R_3$ is H or Na or K.

Preferably, the inventive method forms ion exchangers having carboxyl groups and $—(CH_2)_m NR_1 R_2$ groups of the general formula (I) which form during method step b):

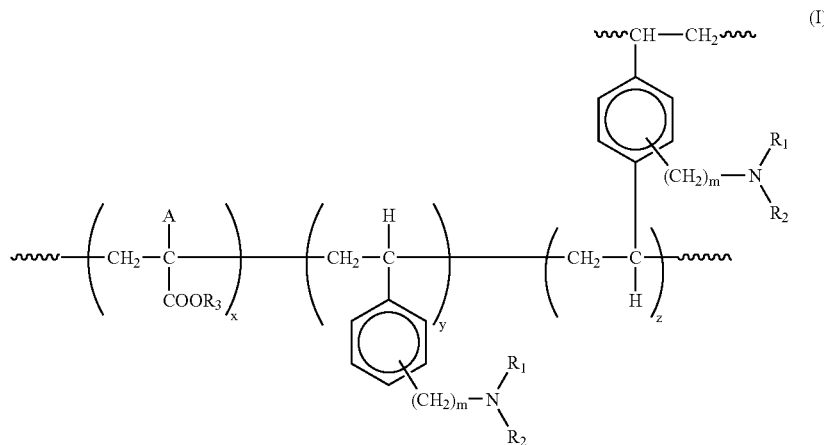

where
x=0.01-0.3,
y=0.7-0.99,
z=0.01-0.2,
A is H or $C_1$-$C_4$-alkyl, preferably $CH_3$,
$R_3$ is H or Na or K,
m is an integer between 1 and 4,
$R_1$ is hydrogen or a radical $CH_2$—$COOR_3$ or $CH_2P(O)(OR_3)_2$ or —$CH_2$—S—$CH_2COOR_3$ or —$CH_2$—S—$C_1$-$C_4$-alkyl or —$CH_2$—S—$CH_2CH(NH_2)COOR_3$ or

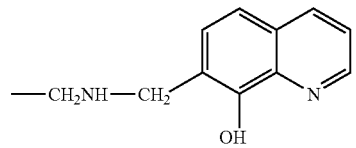

or its derivatives or C=S($NH_2$) and
$R_2$ is a radical $CH_2COOR_3$ or $CH_2P(O)(OR_3)_2$ or —$CH_2$—S—$CH_2COOR_3$ or —$CH_2$—S—$C_1C_4$-alkyl or —$CH_2$—S—$CH_2CH(NH_2)COOR_3$ or

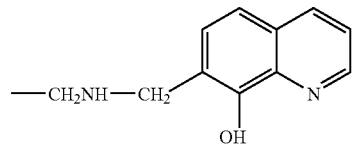

or its derivatives or C=S($NH_2$).
In formula (I),

∼∼∼ indicates the polymer backbone, for example made of styrene and divinylbenzene units.

The inventive chelate-exchange resins having not only carboxyl groups but also —$(CH_2)_mNR_1R_2$ groups preferably exhibit a macroporous structure.

The inventively produced chelate-exchange resins are suitable for the adsorption of metals, in particular heavy metals and noble metals, and their compounds from aqueous solutions and organic liquids. The inventively produced ion exchangers having carboxyl groups and also having chelating groups are particularly suitable for removing heavy metals from aqueous solutions, for example in the purification (ground water remediation) of polluted waters. They are also used for removing noble metals from aqueous solutions (having acidic, neutral or alkaline pH), in particular from aqueous solutions of alkaline earth metals or alkali metals, from brines of chloralkali electrolysis, from aqueous hydrochloric acids, from wastewaters or flue gas scrubbers, or else from liquid or gaseous hydrocarbons, carboxylic acids such as adipic acid, glutaric acid or succinic acid, natural gases, natural gas condensates, petroleums or halogenated hydrocarbons, such as chlorinated or fluorinated hydrocarbons, or chlorofluorocarbons. The inventive ion exchangers, however, are also suitable for removing heavy metals, in particular iron, cadmium or lead, from substances which are reacted during an electrolytic treatment, for example a dimerization of acrylonitrile to form adiponitrile.

The inventively produced ion exchangers are very particularly suitable for removing mercury, iron, cobalt, nickel, copper, zinc, lead, cadmium, manganese, uranium, vanadium, elements of the platinum group, and also gold or silver from the above listed solutions, liquids or gases.

Preference is given in particular according to the invention to the removal of metals which can be present in the oxidation state +III from sulfuric acid solutions of copper. Preferred metals of this group are antimony, bismuth, arsenic, cobalt, nickel, molybdenum or iron, very particular preference is given to antimony, bismuth and molybdenum.

In particular, the inventive ion exchangers, however, are also suitable for removing rhodium or elements of the platinum group and also gold, silver or rhodium or noble metal-containing catalyst residues from organic solutions or solvents.

If the inventive chelate-exchange resins are subjected to a process whereby they are doped or loaded with iron oxide/iron oxyhydroxide, this produces iron oxide/iron oxyhydroxide-containing ion exchangers having not only carboxyl groups but also —$(CH_2)_mNR_1R_2$ groups. The invention therefore also relates to a method for producing iron oxide/ iron oxyhydroxide-containing ion exchangers which bear carboxyl groups and —$(CH_2)_m NR_1R_2$ groups, which is characterized in that A') a bead-type ion exchanger which bears carboxyl groups and —$(CH_2)_m NR_1R_2$ groups is brought into contact with iron(III) salts in aqueous suspension, B') the suspension obtained from stage A') is set to pHs in the range from 3 to 10 by adding alkali metal hydroxides or alkaline earth metal hydroxides and the resultant iron oxide/iron oxyhydroxide-loaded chelate-exchange resin being isolated by known methods.

The present invention therefore also relates to iron oxide/iron oxyhydroxide-loaded ion exchangers which comprise not only carboxyl groups but also —$(CH_2)_m NR_1R_2$ groups obtainable by a) reacting monomer droplets of a mixture of a monovinyl aromatic compound, a polyvinyl aromatic compound, a (meth)acrylic compound, an initiator or an initiator combination and also if appropriate a porogen to give a crosslinked bead polymer, b) functionalizing the resultant bead polymer using chelating groups and in this step reacting the copolymerized (meth)acrylic compounds to form (meth)acrylic acid groups, A') contacting the bead-type ion exchanger which bears carboxyl groups and —$(CH_2)_m NR_1R_2$ groups with iron(III) salts in aqueous suspension, B') setting the suspension obtained from the stage A') to pHs in the range from 3 to 10 by adding alkali metal hydroxides or alkaline earth metal hydroxides and isolating the resultant iron oxide/iron oxyhydroxide-loaded chelate-exchange resin by known methods, where m is an integer from 1 to 4, $R_1$ is hydrogen or a radical $CH_2$—$COOR_3$ or $CH_2P(O)(OR_3)_2$ or —$CH_2$—S—$CH_2COOR_3$ or —$CH_2$—S—$C_1$-$C_4$-alkyl or —$CH_2$—S—$CH_2CH(NH_2)COOR_3$ or —CH$_2$NH—CH$_2$— [quinolin-8-ol group]

or its derivatives or C=S(NH$_2$), $R_2$ is a radical $CH_2COOR_3$ or $CH_2P(O)(OR_3)_2$ or —$CH_2$—S—$CH_2COOR_3$ or —$CH_2$—S—$C_1C_4$-alkyl or —$CH_2$—S—$CH_2CH(NH_2)COOR_3$ or —CH$_2$NH—CH$_2$— [quinolin-8-ol group]

or its derivatives or C=S(NH$_2$) and $R_3$ is H or Na or K.

In the case of the inventive chelate-exchange resins, the steps A') and B') can if appropriate be carried out repeatedly after one another. Alternatively to the iron(III) salt, use can also be made of iron(II) salts which are oxidized by known oxidation methods in the reaction medium completely or in part to form ironIII salts. The methods used according to the invention for charging with iron hydroxide/iron oxyhydroxide are described, for example, in DE-A 103 27 110, the contents of which are incorporated by the present application.

The chelate-exchange resins doped with iron oxide/iron oxyhydroxide having not only carboxyl groups but also —$(CH_2)_m NR_1R_2$ groups are brown and are distinguished, in contrast to the prior art, by the formation of an iron oxide/iron oxyhydroxide phase highly specific for the adsorption of heavy metals, preferably arsenic.

According to the invention, heterodisperse or monodisperse inventive celate-exchange resins can be used.

The present invention therefore also relates to the use of the iron oxide/iron oxyhydroxide-doped ion exchangers having not only carboxyl groups but also —$(CH_2)_m NR_1R_2$ groups for the adsorption of arsenic, cobalt, nickel, lead, zinc, cadmium or copper, and also to an adsorption method for these metals using the inventive iron oxide/iron oxyhydroxide-doped chelate-exchange resins.

The present invention is described with reference to specific details and examples of particular embodiments thereof. It is not intended that such details and examples be regarded as limitations upon the scope of the invention except insofar as and to the extent that they are included in the accompanying claims.

As used in this specification and the appended claims, the singular forms "a," "an," and "the" include plural referents unless the content clearly dictates otherwise.

EXAMPLES

Test Methods

Determination of the Amount of Chelating Groups—Total Capacity (TC) of the Resin 100 ml of ion exchanger are packed into a filter column and eluted using 3% strength by weight hydrochloric acid in 1.5 hours. The column is then washed with demineralized water until the effluent is neutral.

50 ml of regenerated ion exchanger are charged in a column with 0.1 n sodium hydroxide solution (=0.1 normal sodium hydroxide solution). The effluent is collected in each case in a 250 ml volumetric flask and the total amount is titrated against methyl orange using 1 n hydrochloric acid.

The solution is applied until 250 ml of effluent have a consumption of 24.5-25 ml of 1 n hydrochloric acid. After examination is completed, the volume of ion exchanger in the Na form is determined.

Total capacity $(TC) = (X \cdot 25 - \Sigma V) \cdot 2 \cdot 10^{-2}$ in mol/l of ion exchanger.

X=number of effluent fractions $\Sigma$ V=total consumption in ml of 1 n hydrochloric acid in titration of the effluents.

Number of Perfect Beads after Production 100 beads are examined under the microscope. The number of beads which have cracks or exhibit fractures is determined. The number of perfect beads results from the difference in the number of damaged beads from 100.

Determination of Resin Stability by the Roller Test

The bead polymer under test is distributed in a uniform layer thickness between two plastic cloths. The cloths are laid on a solid horizontally mounted support and subjected in a roller apparatus to 20 operating cycles. An operating cycle consists of a rolling carried out to and fro. After the rolling, the number of undamaged beads is determined on representative samples of 100 beads by enumeration under the microscope.

Swelling Stability Test 25 ml of chelate-exchange resin in the chloride form are packed into a column. In succession, 4% strength by weight aqueous sodium hydroxide solution, demineralized water, 6% strength by weight hydrochloric acid and again demineralized water are applied to the column, the sodium hydroxide solution and the hydrochloric acid flowing through the resin from the top and the demineralized water being pumped through the resin from the bottom. The treatment proceeds under time control via a controller. One operating cycle lasts 1 h. 20 operating cycles are carried out. After the end of the operating cycles, 100 beads of the resin sample are counted out. The number of perfect beads which are not damaged by cracks or fractures is determined.

Comparative Example of Batch Corresponding to EP-A-0 355 007

1) Production of a Heterodisperse Chelate Resin without Addition of (Meth)Acrylic Compounds 1a) Production of the Bead Polymer In a polymerization reactor, at room temperature 1112 ml of demineralized water, 150 ml of a 2% strength by weight aqueous solution of methylhydroxyethylcellulose and also 7.5 g of disodium hydrogenphosphate·12H$_2$O are charged. The total solution is stirred for one hour at room temperature. Subsequently the monomer mixture consisting of 95.37 g of divinylbenzene 80.53% strength by weight, 864.63 g of styrene, 576 g of isododecane and 7.70 g of dibenzoyl peroxide 75% strength by weight is added. The batch is first allowed to stand for 20 minutes at room temperature and is then stirred for 30 minutes at room temperature at a stirrer speed of 200 rpm (revolutions per minute). The batch is heated to 70° C., stirred for a further 7 hours at 70° C., then heated to 95° C. and stirred for a further 2 hours at 95° C. After cooling, the resultant bead polymer is filtered off and washed with water and dried at 80° C. for 48 hours.

1b) Production of the Amidomethylated Bead Polymer

At room temperature, 1117 ml of 1.2 dichloroethane, 414.5 g of phthalimide and 292.5 g of 30% strength by weight formalin are charged. The pH of the suspension is set to 5.5 to 6 using sodium hydroxide solution. Subsequently, the water is removed by distillation. Then, 30.4 g of sulfuric acid are added. The water formed is removed by distillation. The batch is cooled. At 30° C., 131.9 g of 65% strength by weight oleum are added, subsequently 320.1 g of heterodisperse bead polymer according to method step 1a). The suspension is heated to 70° C. and stirred for a further 6 hours at this temperature. The reaction broth is taken off, demineralized water is added and residual amounts of dichloroethane are removed by distillation.

Yield of the amidomethylated bead polymer: 1310 ml

Composition by elemental analysis: carbon: 78.1% by weight; hydrogen: 5.2% by weight; nitrogen: 4.8% by weight;

1c) Production of the Aminomethylated Bead Polymer 2176 ml of 20% strength by weight sodium hydroxide solution are added at room temperature to 1280 ml of amidomethylated bead polymer from example 2b). The suspension is heated to 180° C. and stirred for 8 hours at this temperature.

The resultant bead polymer is washed with demineralized water.

Yield: 990 ml

Composition by elemental analysis: carbon: 81.9% by weight; hydrogen: 7.7% by weight; nitrogen: 7.1% by weight;

Aminomethyl group content of the resin: 2.14 mol/l

1d) Conversion of the Aminomethylated Resin into a Chelate Resin having Iminodiacetic Acid Groups 927 ml of demineralized water are placed in a reactor. To this are added 880 ml of aminomethylated bead polymer from example 2c). The suspension is heated to 90° C. Then 400 g of 80% strength by weight aqueous chloroacetic acid are added in 4 hours at 90° C. The pH is maintained in this case by adding 50% strength by weight sodium hydroxide solution at pH 9.2. Subsequently the suspension is heated to 95° C. The pH is set to 10.5 by adding 50% strength by weight sodium hydroxide solution. The solution is stirred for a further 6 hours at 95° C. and pH 10.5.

The suspension is cooled and the resin is filtered off through a sieve. Subsequently it is washed with demineralized water.

Yield: 1280 ml

Composition by elemental analysis: carbon: 67.2% by weight; hydrogen: 6.0% by weight; nitrogen: 4.6% by weight Amount of chelating groups: 1.97 mol/l Values on resin stability and the pore volumes are summarized in table 1.

Values on uptake capacity of nickel ions are summarized in table 2.

Example 2 (According to the Present Invention)

2) Production of a Heterodisperse Chelate Resin Additionally Having Acrylic Acid Groups 2a) Production of the Bead Polymer In a polymerization reactor, at room temperature, 1112 ml of demineralized water, 150 ml of a 2% strength by weight aqueous solution of methylhydroxyethylcellulose and also 7.5 g of disodium hydrogenphosphate·12H$_2$O and 0.2 g of resorcinol are charged. The entire solution is stirred for one hour at room temperature. Subsequently, the monomer mixture consisting of 96.19 g of divinylbenzene 79.84% strength by weight, 806.2 g of styrene, 576 g of isododecane, 58.18 g of methyl acrylate and 7.50 g of dibenzoyl peroxide 75% strength by weight are added. The batch is first allowed to stand for 20 minutes at room temperature and is then stirred for 30 minutes at room temperature at a stirring speed of 200 rpm. The batch is heated to 70° C., stirred for a further 7 hours at 70° C., then heated to 95° C. and stirred for a further 2 hours at 95° C. After cooling, the resultant bead polymer is filtered off and washed with water and dried for 48 hours at 80° C.

Yield: 960.5 g of bead polymer

2b) Production of the Amidomethylated Bead Polymer

At room temperature, 1117 ml of 1,2dichloroethane, 414.5 g of phthalimide and 297.6 g of 29.0% strength by weight of formalin are charged. The pH of the suspension is set to 5.5 to 6 using sodium hydroxide solution. Subsequently, the water is removed by distillation. Then, 30.4 g of sulfuric acid are added. The resultant water is removed by distillation. The batch is cooled. At 30° C., 131.9 g of 65% strength oleum are added, subsequently 320.1 g of heterodisperse bead polymer according to method step 2a). The suspension is heated to 70° C. and stirred for a further 6 hours at this temperature. The reaction broth is taken off, demineralized water is added and dichloroethane residues are removed by distillation.

Yield of amidomethylated bead polymer: 1570 ml

Composition by elemental analysis: carbon: 76.7% by weight; hydrogen: 5.2% by weight; nitrogen: 5.0% by weight;

2c) Production of the Aminomethylated Bead Polymer 2618 ml of 20% strength by weight sodium hydroxide solution are added at room temperature to 1540 ml of amidomethylated bead polymer from example 2b). The suspension is heated to 180° C. and stirred for 8 hours at this temperature.

The resultant bead polymer is washed with demineralized water.

Yield: 1350 ml

Composition by elemental analysis: carbon: 79.5% by weight; hydrogen: 8.1% by weight; nitrogen: 8.8% by weight;

Aminomethyl group content of the resin: 1.71 mol/l

2d) Conversion of the Aminomethylated Resin into a Chelate Resin Having Iminodiacetic Acid Groups and Additionally Acrylic Acid Groups 1327 ml of demineralized water are charged in a reactor. To this are added 1260 ml of aminomethylated bead polymer from example 2c). The suspension is heated to 90° C. Then, in the course of 4 hours, 458.1 g of 80% strength by weight aqueous chloroacetic acid solution are added at 90° C. The pH is maintained here at pH 9.2 by adding 50% strength by weight sodium hydroxide solution. Subsequently the suspension is heated to 95° C. The pH is set to 10.5 by adding 50% strength by weight sodium hydroxide solution. It is stirred for a further 6 hours at 95° C. and pH 10.5.

The suspension is cooled and the resin is filtered off through a sieve. Subsequently it is washed with demineralized water.

Yield: 2000 ml

Composition by elemental analysis: carbon: 61.0% by weight; hydrogen: 5.8% by weight; nitrogen: 4.9% by weight Amount of chelating groups: 1.98 mol/l Values on resin stability and on pore volumes are summarized in table 1.

Values on the uptake capacity of nickel ions are summarized in table 2.

Example 3

Production of a Monodisperse Chelate Resin Additionally Having Acrylic Acid Groups 3a) Production of a Monodisperse Acrylonitrile-Containing Bead Polymer In a 4 l flange-joint vessel having a gate agitator, cooler, temperature sensor and also thermostat and temperature recorder, an aqueous charge of 440.4 g of demineralized water, 1.443 g of gelatin, 0.107 g of resorcinol and 0.721 g of anhydrous disodium hydrogenphosphate is produced. To this charge is added with stirring at 150 rpm a mixture of 500 g of water and 500 g of microencapsulated monomer droplets having a uniform particle size of 380 µm, the microencapsulated monomer droplets consisting of a capsule content of 56.4% by weight styrene, 4.6% by weight 80% divinylbenzene, 38.5% by weight isododecane and 0.50% by weight tert-butylperoxy 2-ethylhexanoate as initiator and a capsule wall of a formaldehyde-hardened complex coacervate of gelatin and an acrylamide/acrylic acid copolymer. To this mixture are added 18.3 g of acrylonitrile. Thereafter, the mixture is heated at 73° C. for 6 hours and subsequently at 94° C. for 2 hours for hardening. The batch is washed over a 32 µm sieve and dried in vacuum at 80° C. for 24 hours. This produces 305 g of a monodisperse macroporous polymer having a nitrogen content of 1.6% and an acrylonitrile content calculated therefrom of 6.1%.

3b) Production of the Amidomethylated Bead Polymer

At room temperature, 1370 ml of 1,2dichloroethane, 248.7 g of phthalimide and 174.9 g of 29.6% strength by weight formalin are charged. The pH of the suspension is set to 5.5 to 6 using sodium hydroxide solution. Subsequently the water is removed by distillation. Then, 18.2 g of sulfuric acid are added. The resultant water is removed by distillation. The batch is cooled. At 30° C., 79.1 g of 65% strength oleum are added, subsequently 190.9 g of monodisperse bead polymer according to method step 3a). The suspension is heated to 70° C. and stirred for a further 6 hours at this temperature. The reaction broth is taken off, demineralized water is added and residues of dichloroethane are removed by distillation.

Yield of amidomethylated bead polymer: 1160 ml

Composition by elemental analysis: carbon: 75.8% by weight; hydrogen: 5.1% by weight; nitrogen: 5.5% by weight;

3c) Production of the Aminomethylated Bead Polymer

To 1140 ml of amidomethylated bead polymer from example 3b), 1938 ml of 20% strength by weight sodium hydroxide solution are added at room temperature. The suspension is heated to 180° C. and stirred at this temperature for 8 hours.

The resultant bead polymer is washed with demineralized water.

Yield: 930 ml

Composition by elemental analysis: carbon: 78.9% by weight; hydrogen: 7.9% by weight; nitrogen: 7.8% by weight;

Aminomethyl group content of the resin: 1.27 mol/l

3d) Conversion of the Aminomethylated Resin into a Chelate Resin Having Iminodiacetic Acid Groups and Additionally Acrylic Acid Groups 463 ml of demineralized water are charged in a reactor. To this are added 440 ml of aminomethylated bead polymer from example 3c). The suspension is heated to 90° C. Then, in the course of 4 hours, 132 g of 80% strength by weight aqueous chloroacetic acid are added at 90° C. The pH is maintained at pH 9.2 during this by adding 50% strength by weight sodium hydroxide solution. Subsequently, the suspension is heated to 95° C. The pH is set to 10.5 by adding 50% strength by weight sodium hydroxide solution. It is stirred for a further 6 hours at 95° C. and pH 10.5.

The suspension is cooled and the resin is filtered off over a sieve. Subsequently it is washed with demineralized water.

Yield: 710 ml

Composition by elemental analysis: carbon 63.9% by weight; hydrogen: 5.9% by weight; nitrogen: 5.1% by weight Amount of chelating groups: 1.62 mol/l Values on resin stability and pore volumes are summarized in table 1.

Values on the uptake capacity of nickel ions are summarized in table 2.

Example 4

Determination of the Uptake of Nickel Ions from Aqueous Solutions

Resin Conditioning 50 ml of chelate resin from examples 1 to 4 are packed into a glass column. In the course of 2 hours, 5 bed volumes of 7% strength by weight hydrochloric acid and subsequently 1000 ml of demineralized water are filtered through. Thereafter, in the course of 2 hours, first 6 bed volumes of 4% strength by weight sodium hydroxide solution and subsequently 10 bed volumes of demineralized water are filtered through.

Testing the Nickel Uptake Capacity 500 ml of a solution comprising 14 g of $MgCl_2$ per liter of solution and 0.773 g of $NiCl_2$ per liter of solution are charged into a glass beaker. The pH of the solution is set to 4.5. 25 ml of conditioned resin are withdrawn, added to the solution and stirred.

After 5, 10, 30, 60 and 240 minutes, 10 ml of solution are taken off and analyzed for their nickel content. The decrease in nickel content in the solution is determined in comparison with the original content).

TABLE 1

| Example | Yield of end product in ml per gram of bead polymer | Total porosity in % | Total capacity in mol/l | Original stability % whole beads | Roller stability % whole beads | Swelling stability % whole beads of 100 |
|---|---|---|---|---|---|---|
| 1 | 5.05 | 36 | 2.31 | 97 | 90 | 96 |
| 2 | 6.8 | 42 | 1.98 | 99 | 94 | 97 |
| 3 | 7.6 | 53 | 1.62 | 100 | 95 | 100 |

TABLE 2

| C/C(o) after x minutes | Example 1 | Example 2 | Example 3 |
|---|---|---|---|
| 0 | 1 | 1 | 1 |
| 5 | 0.607 | 0.58 | 0.072 |
| 10 | 0.393 | 0.21 | 0.015 |
| 30 | 0.196 | 0.04 | 0.002 |
| 60 | 0.071 | 0.01 | 0.001 |
| 240 | 0.006 | 0 | 0 |

Example 1 comprises the production of a heterodisperse chelate resin of the iminodiacetic acid type without addition of acrylic monomers.

Example 2 comprises the production of a heterodisperse chelate resin of the iminodiacetic acid type with addition of methyl acrylate which, in the course of the functionalization, becomes acrylic acid units.

Example 3 comprises the production of a monodisperse chelate resin of the iminodiacetic acid type with addition of acrylonitrile which, in the course of functionalization, becomes acrylic acid units.

The incorporation of acrylic acid groups into the chelate resins significantly affects the morphology (porosity) and properties (total capacity, stabilities, resin yield) of these resins.

The yield of end product and also the total porosity increase significantly—examples 2 and 3 in comparison with 1.

The total capacity decreases, since because of the higher yield of end product, the amount of functional groups must be distributed over a greater volume and the total capacity is a volume-specific quantity.

The incorporation of acrylic acid groups leads to improved stabilities—original state, roller stability and swelling stability.

Table 2 shows the uptake capacity for nickel of the chelate resins produced in examples 1 to 3. C/C(o) is the decrease of the nickel concentration c at a defined time point (x minutes) compared with the initial concentration C(o).

In all three experiments the same amount of chelate resin is used—25 ml. Since the three resins exhibit markedly differing values of total capacity, the three 25 ml resin amounts also comprise different amounts of chelate groups.

The chelate resins produced in examples 2 and 3 additionally having acrylic acid groups take up nickel ions significantly more rapidly than the resin from example 1 which comprises no additional acrylic acid groups. Even though the 25 ml chelate resin from examples 2 and 3 comprise fewer chelate groups because of the lower total capacity than the 25 ml of chelate resin from example 1.

Example 5

Production of an iron oxide/iron oxyhydroxide-loaded monodisperse chelate resin of the iminodiacetic acid type additionally having acrylic acid groups according to the present invention.

400 ml of the chelate resin produced according to example 3 having iminodiacetic acid groups additionally having acrylic acid groups are admixed with 750 ml of aqueous iron(III) chloride solution comprising 103.5 g of iron(III) chloride per liter and 750 ml of deionized water and stirred for 2.5 hours at room temperature. Subsequently a pH of 6 is set using 10% strength by weight sodium hydroxide solution and maintained for 2 h.

Thereafter the ion exchanger is filtered off over a sieve and washed with deionized water until the effluent is clear.

Resin yield: 380 ml

The Fe content of the loaded ion exchanger spheres was determined by titration at 14.4%.

As crystalline phase, $\alpha$-FeOOH may be identified from powder diffractograms.

13.1 g of the ion exchanger, of which about 3.0 g were FeOOH, were brought into contact with an aqueous solution of Na$_2$HAsO$_4$ and the decrease in the As(V) concentration with time was recorded.

TABLE 3

| As(V) contents in the filtrate [µg/l] after x min | | | | | | |
|---|---|---|---|---|---|---|
| 0' | 5' | 10' | 30' | 60' | 120' | 360' |
| 2700 | 2000 | 1800 | 1400 | 1100 | 630 | 120 |

Table 3 shows the marked decrease of arsenic(V) concentration as a function of time during the treatment with an iron oxide/iron oxyhydroxide-loaded monodisperse chelate resin of the iminodiacetic acid type having additional acrylic acid groups.

What is claimed is:

1. A method for producing an ion exchanger which comprises carboxyl groups and —(CH$_2$)$_m$NR$_1$R$_2$ groups, comprising the steps of:
   a) reacting monomer droplets of a mixture of a monovinyl aromatic compound, a polyvinyl aromatic compound, a (meth)acrylic compound, and an initiator or an initiator combination, thereby, forming a crosslinked bead polymer, and
   b) functionalizing the crosslinked bead polymer using chelating groups and reacting, in this functionalizing step, the copolymerized (meth)acrylic compounds to form (meth)acrylic acid groups, where
   m is an integer from 1 to 4,
   R$_1$ is hydrogen or a radical CH$_2$—COOR$_3$ or CH$_2$P(O)(OR$_3$)$_2$ or —CH$_2$—S—CH$_2$COOR$_3$ or —CH$_2$—S—C$_1$—C$_4$-alkyl or —CH$_2$—S—CH$_2$CH(NH$_2$)COOR$_3$ or

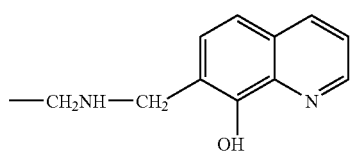

or its derivatives or C═S(NH$_2$),
R$_2$ is a radical CH$_2$COOR$_3$ or CH$_2$P(O)(OR$_3$)$_2$ or —CH$_2$—S—CH$_2$COOR$_3$ or —CH$_2$—S—C$_1$C$_4$-alkyl or —CH$_2$—S—CH$_2$CH(NH$_2$)COOR$_3$ or

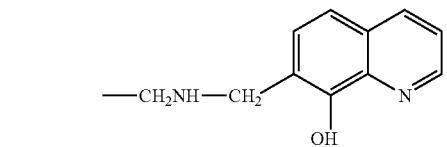

or its derivatives or C═S(NH$_2$) and
R$_3$ is H or Na or K.

2. An ion exchanger which comprises carboxyl groups and —(CH$_2$)$_m$NR$_1$R$_2$ groups obtained by
   a) reacting monomer droplets of a mixture of a monovinyl aromatic compound, a polyvinyl aromatic compound, a (meth)acrylic compound, an initiator or an initiator combination and also if appropriate a porogen to give a crosslinked bead polymer,
   b) functionalizing the resultant bead polymer using chelating groups and, in this functionalizing step, reacting the copolymerized (meth)acrylic compounds to form (meth)acrylic acid groups, where
   m is an integer from 1 to 4,
   R$_1$ is hydrogen or a radical CH$_2$—COOR$_3$ or CH$_2$P(O)(OR$_3$)$_2$ or —CH$_2$—S—CH$_2$COOR$_3$ or —CH$_2$—S—C$_1$-C$_4$-alkyl or —CH$_2$—S—CH$_2$CH(NH$_2$)COOR$_3$ or or its derivatives or C═S(NH$_2$),
R$_2$ is a radical CH$_2$COOR$_3$ or CH$_2$P(O)(OR$_3$)$_2$ or —CH$_2$—S—CH$_2$COOR$_3$ or —CH$_2$—S—C$_1$C$_4$-alkyl or —CH$_2$—S—CH$_2$CH(NH$_2$)COOR$_3$ or or its derivatives or C═S(NH$_2$) and
R$_3$ is H or Na or K.

3. The ion exchanger according to claim 2, wherein the composition is according to the general formula (I)

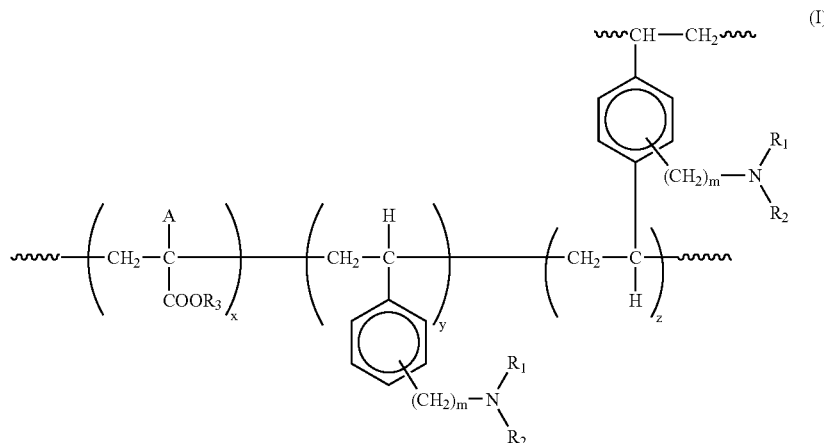

where
x is equal to 0.01-0.3,
y is equal to 0.7-0.99,
z is equal to 0.01-0.2,
m is an integer between 1 and 4,
A is H or $C_1$-$C_4$-alkyl, preferably $CH_3$,
$R_3$ is H or Na or K,
$R_1$ is hydrogen or a radical $CH_2$—$COOR_3$ or $CH_2P(O)(OR_3)_2$ or —$CH_2$—S—$CH_2COOR_3$ or —$CH_2$—S—$C_1$-$C_4$-alkyl or —$CH_2$—S—$CH_2CH(NH_2)COOR_3$ or

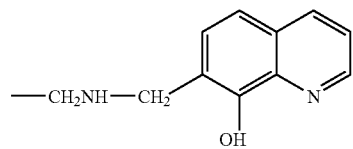

or its derivatives or C=(NH$_2$) and
$R_2$ is a radical $CH_2COOR_3$ or $CH_2P(O)(OR_3)_2$ or —$CH_2$—S—$CH_2COOR_3$ or —$CH_2$—S—$C_1C_4$-alkyl or —$CH_2$—S—$CH_2CH(NH_2)COOR_3$ or

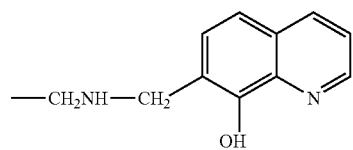

or its derivatives or C=S(NH$_2$).

4. A method for producing an iron exchanger loaded with iron oxide/iron oxyhydroxide comprising carboxyl groups and —(CH$_2$)$_m$NR$_1$R$_2$ groups, wherein the —(CH$_2$)$_m$NR$_1$R$_2$ groups are defined as in claim 2, comprising:
A') contacting a bead-type chelate-exchange resin having said carboxyl groups and —(CH$_2$)$_m$NR$_1$R$_2$ groups with iron(III) salts in an aqueous suspension,
B') setting the pH of the suspension obtained from stage A') in the range from 3 to 10 by adding alkali metal hydroxides or alkaline earth metal hydroxides and isolating the resultant iron oxide/iron oxyhydroxide-comprising chelate-exchange resin.

5. An iron oxide/iron oxyhydroxide-loaded ion exchanger which comprises carboxyl groups and —(CH$_2$)$_m$NR$_1$R$_2$ groups which is obtained by
a) reacting monomer droplets of a mixture of a monovinyl aromatic compound, a polyvinyl aromatic compound, a (meth)acrylic compound, and an initiator or an initiator combination to give a crosslinked bead polymer,
b) functionalizing the resultant bead polymer using chelating groups and, in this functionalizing step, reacting the copolymerized (meth)acrylic compounds to form (meth)acrylic acid groups,
A') contacting the bead-type ion exchanger which bears carboxyl groups and —(CH$_2$)$_m$NR$_1$R$_2$ groups with iron (III) salts in aqueous suspension,
B') setting the pH of the suspension obtained from stage A') in the range from 3 to 10 by adding alkali metal hydroxides or alkaline earth metal hydroxides and isolating the resultant iron oxide/iron oxyhydroxide-loaded chelate-exchange resin, where
m is an integer from 1 to 4,
$R_1$ is hydrogen or a radical $CH_2$—$COOR_3$ or $CH_2P(O)(OR_3)_2$ or —$CH_2$—S—$CH_2COOR_3$ or —$CH_2$—S—$C_1$-$C_4$-alkyl or —$CH_2$—S—$CH_2CH(NH_2)COOR_3$ or

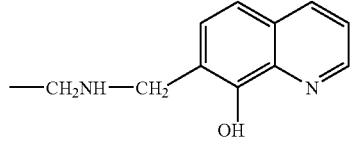

or its derivatives or C=S(NH$_2$),
$R_2$ is a radical $CH_2COOR_3$ or $CH_2P(O)(OR_3)_2$ or —$CH_2$—S—$CH_2COOR_3$ or —$CH_2$—S—$C_1C_4$-alkyl or —$CH_2$—S—$CH_2CH(NH_2)COOR_3$ or

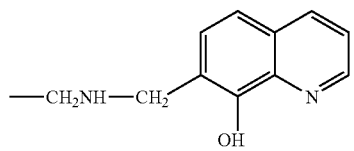

or its derivatives or C=S(NH$_2$) and
$R_3$ is H or Na or K.

6. A process for the adsorption of heavy metals, comprising: contacting the iron oxide/iron oxyhydroxide-loaded chelate-exchange resin according to claim 5 with said heavy metal.

7. The process according to claim 6, wherein the heavy metal is arsenic, cobalt, nickel, lead, zinc, cadmium, copper, or a combination thereof.

8. A process for the adsorption of a heavy or noble metal and its compounds from a heavy or noble metal-containing aqueous solution or organic solution, comprising: contacting the ion exchanger according to claim 2 with the heavy or noble metal-containing aqueous solution or organic solution.

9. The process according to claim 8, wherein the heavy or noble metal is mercury, iron, cobalt, nickel, copper, zinc, lead, cadmium, manganese, uranium, vanadium, elements of the platinum group, gold, or silver.

10. The process according to claim 8, wherein the solution is a copper sulfuric acid solution and the heavy or noble metal is one capable of a +III oxidation state and wherein said heavy or noble metal is present in the oxidation state +III.

11. The process according to claim 9, wherein rhodium, at least one of the elements of the platinum group, gold, or silver, or a noble metal-containing catalyst residue is removed from the organic solutions.

12. A process for the adsorption of a heavy or noble metal and its compounds from a heavy or noble metal-containing aqueous solution or organic solution, comprising: contacting the ion exchanger according to claim 3 with the heavy or noble metal-containing aqueous solution or organic solution.

13. The process according to claim 12, wherein the heavy or noble metal is mercury, iron, cobalt, nickel, copper, zinc, lead, cadmium, manganese, uranium, vanadium, elements of the platinum group, gold, or silver.

14. The process according to claim 12, wherein the solution is a copper sulfuric acid solution and the heavy or noble metal is present in the oxidation state +III.

15. The process according to claim 13, wherein rhodium, at least one of the elements of the platinum group, gold, or silver, or a noble metal-containing catalyst residue is removed from the organic solutions.

16. A method for producing an iron exchanger loaded with iron oxide/iron oxyhydroxide comprising carboxyl groups and $—(CH_2)_m NR_1 R_2$ groups, wherein the $—(CH_2)_m NR_1 R_2$ groups are defined as in claim 3, comprising:
   A') contacting a bead-type chelate-exchange resin having said carboxyl groups and $—(CH_2)_m NR_1 R_2$ groups with iron(III) salts in an aqueous suspension,
   B') setting the pH of the suspension obtained from stage A') in the range from 3 to 10 by adding alkali metal hydroxides or alkaline earth metal hydroxides and isolating the resultant iron oxide/iron oxyhydroxide-comprising chelate-exchange resin.

17. The method according to claim 1, wherein the reacting step includes a porogen being a part of said reacting.

* * * * *